(12) United States Patent
Webb et al.

(10) Patent No.: US 6,565,127 B2
(45) Date of Patent: May 20, 2003

(54) PIPE COUPLING DEVICE AND ASSEMBLY

(75) Inventors: Michael Webb, Chester Springs, PA (US); Kevin Struthers, Clayton, NC (US)

(73) Assignee: Environ Products, Inc., Smithfield, NC (US)

( * ) Notice: Subject to any disclaimer, the term of this patent is extended or adjusted under 35 U.S.C. 154(b) by 0 days.

(21) Appl. No.: 10/094,012

(22) Filed: Mar. 7, 2002

(65) Prior Publication Data

US 2002/0163186 A1 Nov. 7, 2002

Related U.S. Application Data

(60) Provisional application No. 60/274,133, filed on Mar. 8, 2001.

(51) Int. Cl.[7] .............................................. F16L 41/00
(52) U.S. Cl. .............................. 285/123.15; 285/133.11; 285/123.1
(58) Field of Search ......................... 285/123.15, 123.1, 285/133.11, 133.21

(56) References Cited

U.S. PATENT DOCUMENTS

| | | | | |
|---|---|---|---|---|
| 4,886,305 A | * | 12/1989 | Martin | 138/113 |
| 5,203,384 A | * | 4/1993 | Hansen | 141/105 |
| 5,265,652 A | * | 11/1993 | Brunella | 137/234.6 |
| 5,277,455 A | * | 1/1994 | Graves et al. | 285/123.1 |
| 5,398,976 A | * | 3/1995 | Webb | 285/148.23 |
| 5,427,474 A | * | 6/1995 | Silvers | 285/123.1 |
| 5,449,204 A | * | 9/1995 | Greene et al. | 138/113 |
| 5,628,532 A | * | 5/1997 | Ashcraft | 285/123.15 |
| 5,687,993 A | * | 11/1997 | Brim | 285/120.1 |
| 5,927,762 A | * | 7/1999 | Webb | 285/123.15 |
| 6,428,054 B1 | * | 8/2002 | Zappa et al. | 285/123.15 |

* cited by examiner

Primary Examiner—Eric K. Nicholson
(74) Attorney, Agent, or Firm—Drinker Biddle & Reath LLP

(57) ABSTRACT

A pipe coupling assembly for double-wall pipe having an interstice between an inner pipe and an outer pipe, which joins the terminal ends of adjacent sections of the double-wall pipe to a fitting element, as a tee or elbow fitting, as well as to a connector tube bypass assembly. The coupling assembly provides fluid communication between the interstices of the adjacent sections of the double-wall pipe and the connector tube bypass assembly but does not permit fluid from the interstices of the pipes to pass through the pipe fitting.

17 Claims, 2 Drawing Sheets

PIPE COUPLING DEVICE AND ASSEMBLY

CROSS REFERENCE TO RELATED APPLICATIONS

This application claims the benefit of U.S. Provisional Application No. 60/274,133, filed Mar. 8, 2001.

OVERVIEW

A pipe coupling and assembly according to the present invention is well suited for use with coaxial pipe systems, such as that disclosed by U.S. Pat. Nos. 5,297,896 and 5,927,762, both to Webb and incorporated herein by reference.

DETAILED DESCRIPTION

Figure 1:
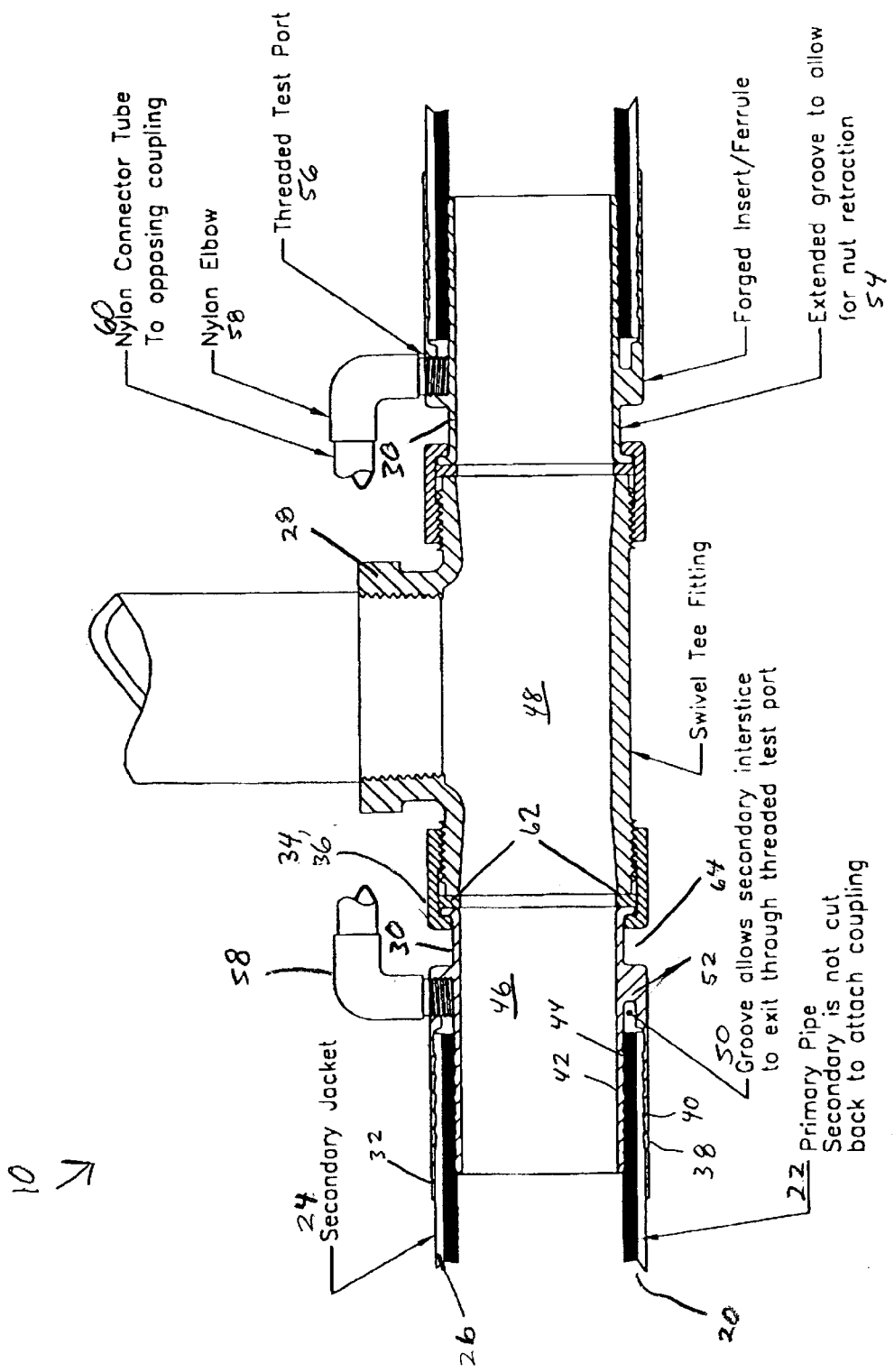
FIG. 1 shows a coupling assembly of the present invention in longitudinal cross section.

FIG. 1 shows a coupling assembly in longitudinal cross section, generally identified by the numeral 10. The pipes 20 of the system include an inner tubular member 22, an outer tubular member 24 and an interstice 26 therebetween. The embodiment of the coupling assembly 10 shown in the Figures comprises two pipe engaging members 30, which are the same in all material respects. The two pipe engaging members 30, appearing as mirror images of each other, are shown connected to pipes engaged with a "T" fitting 28. For purposes of clarity, some elements have been labeled on only one of the two pipe engaging members 30 shown in the Figures.

A pipe engaging member 30, preferably metal, is adapted to be secured to the end of a pipe 20. The pipe engaging member 30 has a proximal end 32 for engaging the pipe, and a distal end 34 for engaging a pipe fitting 28 or second run of pipe. A connecting member is disposed on the distal end 34, optimally in the form of a threaded locking collar 36 for engaging a corresponding fitting. Alternatively, the connecting member may comprise other coupling means, such as a reducing coupling, straight run of pipe for accepting a coupling, or the like.

The proximal end 32 of the pipe engaging member 30 comprises a ferrule 38 for engaging the outside surface of the outer tubular member 24 of the pipe 20. Optimally, the ferrule 38 includes teeth 40 or other suitable means disposed on its inside surface for gripping the outside surface of the outer tubular member 24 and forming a fixed engagement therewith. If the engagement between ferrule 38 and the outer tubular member 24 does not form a seal, sealing means (not shown), such as one or more "O" rings may be provided.

The proximal end 32 further includes an insertion length 42 for engaging the inside surface of the inner tubular member 22. The outside surface of the insertion length 42 is preferably provided with teeth 44 or other suitable means for engaging the inside surface of the inner tubular member 22 and forming a fixed engagement therewith. If the engagement between the insertion length 42 and the inner tubular member 22 does not form a seal, sealing means (not shown), such as one or more "O" rings may be provided.

When the pipe engaging member 30 is installed with a pipe and engaged with a fitting 28 (as described below) or second run of pipe, fluid within the inner tubular member 22 is in communication with the interior 46 of the pipe engaging member 30, as well as the interior volume 48 of the fitting.

The pipe engaging member 30 is provided with a groove 50 disposed between the ferrule 38 and the insertion length 42, preferably between the end of the teeth 40, 44 and a region 52 at which the ferrule 38 and the insertion length 42 converge. The groove 50 is in fluid communication with the interstice 26 of pipe 20. A test port 56 is disposed adjacent region 52 in fluid communication with groove 50 and, thus, with interstice 26. The test port 56 is preferably threaded to allow engagement of a relatively small pipe fitting or elbow 58. Pipe fitting or elbow 58 is provided with a tube 60, shown cut away in FIG. 1. Tube 60 connects the two elbows 58 of each coupling insert 30. Thus, fluid within the two interstices 26 of two pipes 20 is in communication via two grooves 50, test ports 56, elbows 58 and tube 60.

As noted above, a connecting member, preferably a threaded locking collar 36, is disposed on the distal end 34 of the pipe engaging member 30. The locking collar 36 is free to rotate about the longitudinal axis of the pipe engaging member 30; but, the locking collar 36 is restricted from moving longitudinally past the distal end 34 of the pipe engaging member 30 by a lip 62. Thus, the locking collar 36 is free to engage corresponding threads on a fitting 28. An extended groove 64 is provided adjacent the region 52 (opposite groove 50, and between region 52 and the lip 62). The extended groove 64 allows the locking collar 36, to be unscrewed from a threaded engagement with the fitting 28. In embodiments of the inventions employing an alternative connecting member, the extended groove 62 may be modified or omitted as necessary.

Figure 2:
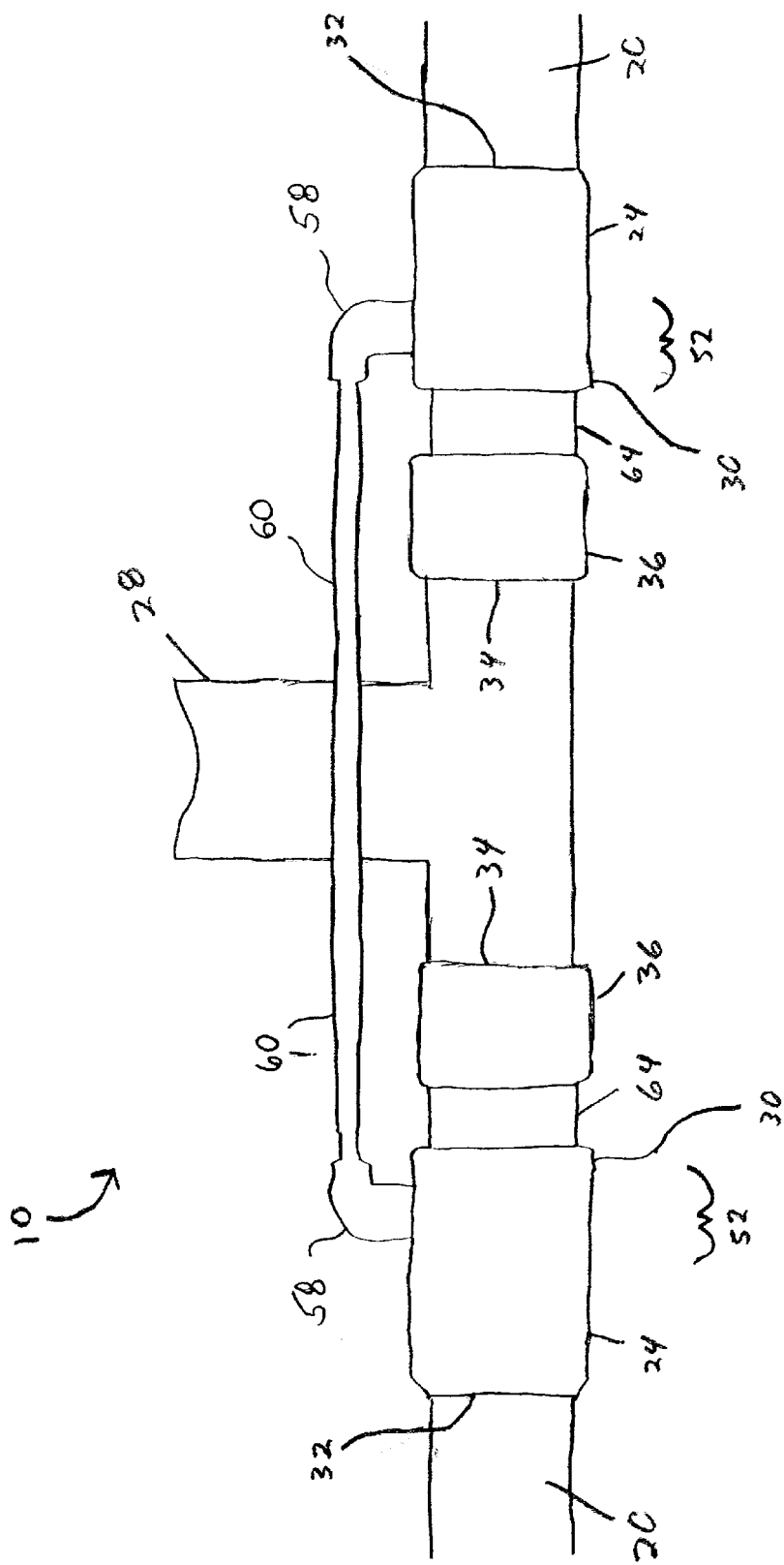
FIG. 2 shows a coupling assembly of the present invention in plan.

FIG. 2 shows a side view of the assembly of FIG. 1. The "T" fitting 28 is engaged with two pipes 20 via two pipe engaging members 30. The proximal end 32 of each pipe engaging member 30 comprises a ferrule 38 and an insertion length (element 42 in FIG. 1), of which only the ferrule 38 is visible in FIG. 2. The distal end 34 comprises a connecting member, preferably a locking collar 36.

An elbow 58 is engaged with a test port (element 56 in FIG. 1) of each pipe engaging member 30, the test port being disposed adjacent a region 52 where the ferrule 38 and the insertion length converge. The test ports, and, in turn, the elbows 58 are in fluid communication with the respective interstices of pipes 20 as shown in FIG. 1 and described above with regard thereto. The two elbows 58 are connected to one another and in fluid communication via tube 60.

Thus, the coupling assembly 10 provides fluid communication between the interstices 26 of two pipes 20 engaged to opposite sides of a fitting, such as a "T" fitting, while keeping the fluid therein isolated from the interior 46 of the coupling, as well as the interior volume 48 of the fitting. The invention provides said communication without the need for unwanted cutting of the pipe or provision of adapters required by former attempts to achieve similar goals.

What is claimed is:

1. A pipe coupling assembly for joining the terminal ends of first and second sections of double-wall pipe to a fitting element, the double-wall pipe having an interstice between an inner pipe and an outer pipe, said coupling assembly providing fluid communication between the interstices of the first and second sections of the double-wall pipe, the assembly comprising:

a pipe fitting;

a first pipe engaging member attached to the first section of pipe and to the pipe fitting;

a second pipe engaging member attached to the second section of pipe and to the pipe fitting;
a connector tube bypass assembly for engaging to the first and second pipe engaging members;
    said bypass assembly comprising
        at least two elbows, and
        a connecting tube;
    wherein each pipe engaging member comprises
        a ferrule and an insert connected together at a convergence region of the pipe engaging member, the ferrule and the insert extending from the convergence region in spaced relation to each other, the insert having
            means for fixedly engaging the inner surface of the inner pipe,
        a groove disposed between the ferrule and the insert, and
        a test port for engaging one of the elbows of the bypass assembly;
    wherein the groove of each pipe engaging member is in fluid communication with the interstice of the engaged section of pipe,
    such that fluid entering the interstice of the first section of pipe passes through the groove of the first pipe engaging member to the bypass connecting tube to the groove of the second pipe engaging member and to the interstice of the second section of pipe, and does not pass through the pipe fitting.

2. The pipe coupling assembly of claim 1, wherein at least one of the first and second pipe engaging members is attached to the pipe fitting with a threaded locking collar.

3. The pipe coupling assembly of claim 2, wherein at least one of the pipe engaging members further comprises a lip, the lip restricting the longitudinal movement of the threaded locking collar.

4. The pipe coupling assembly of claim 1, wherein at least one of the first and second pipe engaging members is attached to the pipe fitting with a reducing coupling.

5. The pipe coupling assembly of claim 1, wherein at least one of the first and second pipe engaging members is attached to the pipe fitting with a straight run of pipe for accepting a coupling.

6. The pipe coupling assembly of claim 1, wherein the elbows and connecting tube are nylon.

7. The pipe coupling assembly of claim 1, wherein the means for fixedly engaging the inner surface of the inner pipe further comprises at least one "O" ring.

8. A pipe engaging member having a proximal end and a distal end, the proximal end for engaging a pipe having an inner tubular member and an outer tubular member with an interstice between the inner and outer tubular members, the pipe engaging member comprising:
    a. a connecting member at the distal end of the pipe engaging member;
    b. a tubular ferrule and a tubular insert at the proximal end of the pipe engaging member, the ferrule and the insert connected together at a convergence region of the pipe engaging member, the ferrule and the insert extending away from the convergence region in spaced relation to each other so that the inner and outer tubular members, of the pipe may be positioned therebetween, the ferrule outside the insert and arranged to engage the outer surface of the outer tubular member, the insert arranged to engage the inner surface of the inner tubular member;
    c. a groove between the ferrule and the insert and adjacent to the convergence region, the groove in fluidic communication with the interstice of the pipe when the inner and outer tubular members of the pipe are positioned between the ferrule and the insert; and
    d. an orifice extending through the pipe engaging member into the groove so that the orifice is in fluidic communication with the interstice of the pipe when the inner and outer tubular members of the pipe are positioned between the ferrule and the insert,
wherein an interior of the pipe engaging member extends from its proximal end to its distal end, is in fluidic communication with an interior of the inner tubular member of the pipe, and is not in fluidic communication with the groove.

9. The pipe engaging member of claim 8 wherein the connecting member is a threaded locking collar.

10. The pipe engaging member of claim 9 further comprising a lip, the lip restricting longitudinal movement of the threaded locking collar.

11. The pipe engaging member of claim 8 wherein the connecting member is a reducing coupling.

12. The pipe engaging member of claim 8 wherein the connecting members is a straight run of pipe for accepting a coupling.

13. The pipe engaging member of claim 8 further comprising at least one "O" ring for forming a seal between at least one of the ferrule and the outer surface of the outer tubular member; and, the insert and the inner surface of the inner tubular member.

14. The pipe engaging member of claim 8 wherein the ferrule comprises teeth for engaging the outside surface of the outer ferrule member.

15. The pipe engaging member of claim 8 wherein the insert comprises teeth for engaging the inside surface of the inner tubular member.

16. The pipe engaging member of claim 8 wherein the orifice is threaded for engaging a threaded pipe fitting.

17. The pipe engaging member of claim 8 wherein the groove is narrower than the thickness of the inner and outer tubular members of the pipe to restrict longitudinal movement of the pipe to prevent the pipe from extending in the groove.

* * * * *